United States Patent
Rubel et al.

(10) Patent No.: US 12,402,618 B2
(45) Date of Patent: Sep. 2, 2025

(54) INSECT ELIMINATING DEVICE WITH SIMULATED FLAME AND VACUUM SUCTION ELEMENT

(71) Applicant: PIC Corporation, Linden, NJ (US)

(72) Inventors: Eric Rubel, Westfield, NJ (US); David L. Lowe, Port Monmouth, NJ (US); Lawrence E. Bradford, Scotch Plains, NJ (US)

(73) Assignee: PIC Corporation, Linden, NJ (US)

( * ) Notice: Subject to any disclaimer, the term of this patent is extended or adjusted under 35 U.S.C. 154(b) by 0 days.

(21) Appl. No.: 18/679,913

(22) Filed: May 31, 2024

(65) Prior Publication Data
US 2025/0057142 A1 Feb. 20, 2025

Related U.S. Application Data

(60) Provisional application No. 63/533,243, filed on Aug. 17, 2023.

(51) Int. Cl.
A01M 1/08 (2006.01)

(52) U.S. Cl.
CPC ..................... A01M 1/08 (2013.01)

(58) Field of Classification Search
CPC ....................................................... A01M 1/08
See application file for complete search history.

(56) References Cited

U.S. PATENT DOCUMENTS

| | | |
|---|---|---|
| D989,222 S | 6/2023 | Rubel et al. |
| 2007/0011940 A1* | 1/2007 | Chen .................... A01M 1/023 43/107 |
| 2009/0094883 A1* | 4/2009 | Child .................... A01M 1/023 43/112 |
| 2014/0137462 A1* | 5/2014 | Rocha .................... A01M 1/023 43/113 |
| 2017/0258068 A1 | 9/2017 | Eom |
| 2019/0133106 A1 | 5/2019 | Eom et al. |
| 2022/0022441 A1 | 1/2022 | Dolshun |
| 2024/0215562 A1* | 7/2024 | Romanova ............ A01M 1/106 |
| 2024/0276966 A1* | 8/2024 | Romanova ............. A01M 1/08 |

OTHER PUBLICATIONS

International Search Report and Written Opinion dated Aug. 27, 2024, issued in PCT International Application No. PCT/US2024/031882.

* cited by examiner

*Primary Examiner* — Richard G Davis
(74) *Attorney, Agent, or Firm* — Amster, Rothstein & Ebenstein LLP

(57) ABSTRACT

An insect eliminating device includes a body including a top portion and a bottom portion provided below the top portion; a light portion mounted in the body and including: a UV light element mounted in an open space provided in the top portion; a flickering light portion mounted in the bottom portion; a central conduit providing fluid communication between the open space in the top portion and the bottom portion of the body; a fan, mounted in the bottom portion to direct air from the open space in the top portion, through the central conduit and into the lower portion; and a grid mounted at a bottom end of the central conduit including a plurality of openings sized to allow air and insects to pass downward into the bottom portion of the base and prevent insects from passing upwards into the central conduit.

20 Claims, 4 Drawing Sheets

INSECT ELIMINATING DEVICE WITH SIMULATED FLAME AND VACUUM SUCTION ELEMENT

CROSS-REFERENCE TO RELATED APPLICATIONS

The present application claims benefit of and priority to U.S. provisional patent application Ser. No. 63/533,243 filed Aug. 17, 2023 entitled INSECT ELIMINATING DEVICE WITH SIMULATED FLAME AND VACUUM SUCTION ELEMENT, the entire content of which is hereby incorporate by reference herein.

BACKGROUND

Field of the Disclosure

The present invention relates to an insect eliminating device with a lighting element and a suction element to draw insects into the device.

Related Art

Conventional electric insect eliminating devices are typically focused on pest control and include features that optimize pest removal, however, ignore aesthetics and other useful functionality. While conventional electric insect eliminating devices often emit UV light to attract insects, they do not provide sufficient light to aid those around them to see. Further, their design is typically not aesthetically pleasing.

Further, conventional light based insect eliminating devices typically use an electrified grid to eliminate insects. While such devices may be effective, they rely on the unpredictable activity of the insect to contact the electrified grid in order to eliminate the insect.

Accordingly, it would be beneficial to provide an insect eliminator that avoids these and other problems.

SUMMARY

It is an object of the present disclosure to provide an insect eliminating device including a light portion that provides a simulated flame as well as a suction element to draw insects into the device.

An electric insect eliminating device in accordance with an embodiment of the present disclosure includes: a body including a top portion and a bottom portion provided below the top portion; a light portion mounted in the body and including: a UV light element mounted in an open space provided in the top portion; a flickering light portion mounted in the bottom portion; a central conduit providing fluid communication between the open space in the top portion and the bottom portion of the body; a fan, mounted in the bottom portion to direct air from the open space in the top portion, through the central conduit and into the lower portion; and a grid mounted at a bottom end of the central conduit including a plurality of openings sized to allow air and insects to pass downward into the bottom portion of the base and prevent insects from passing upwards into the central conduit.

In embodiments, the UV light element is a UV light emitting diode.

In embodiments, the flickering light portion includes a first group of light emitting elements configured to emit light in a first pattern and a second group of light emitting elements configured to emit light in a second pattern.

In embodiments, the insect eliminating device includes a support provided in the bottom portion of the body, wherein the first group of light emitting elements and the second group of light emitting elements are mounted on the support.

In embodiments, the insect eliminating device includes a shade mounted in the bottom portions of the body, wherein the shade surrounds the flickering light portion.

In embodiments, the light portion includes at least one constant light element.

In embodiments, the insect eliminating device includes a cage element provided around the bottom portion of the body configured to prevent insects from exiting the bottom portion of the body.

In embodiments, the insect eliminating device includes a control circuit operably connected to the light portion and the fan to selectively activate the UV light portion, the flickering light portion and the fan to draw insects from the open space in the top portion into the central conduit and to the bottom portion of the body.

In embodiments, the insect eliminating device includes a light sensor operably connected to the control circuit, wherein the control circuit selectively activates the light portion and the fan based on an ambient light level detected by the light sensor.

In embodiments, the insect eliminating device includes an input device operably connected to the control circuit, wherein the control circuit selectively activates the light portion and the fan based on input provided by the input device.

In embodiments, the insect eliminating device includes a power source mounted in the body and configured to provide power to the control circuit, light portion and the fan.

In embodiments, the power source is a battery.

In embodiments, the power source is a rechargeable battery.

In embodiments, the insect eliminating device includes a solar panel mounted on a top of the body and operably connected to the power source to recharge the power source.

In embodiments, the control circuit includes a charging circuit configured to control charging of the power source.

In embodiments, the insect eliminating device includes a wire connectable to an exterior power source, wherein the wire is electrically connected to the power source and operable to recharge the power source.

In embodiments, the insect eliminating device includes an input device operably connected to the control circuit, wherein the control circuit selectively operates the light portion and the fan based on input provided by the input device.

In embodiments, the insect eliminating device includes a stand configured to receive the body.

In embodiments, the light portion includes a constant light source.

In embodiments, the constant light source includes a plurality of constant light elements.

BRIEF DESCRIPTION OF THE DRAWINGS

The above and related objects, features and advantages of the present disclosure will be more fully understood by reference to the following, detailed description of the preferred, albeit illustrative, embodiments of the present invention when taken in conjunction with the accompanying figures, wherein.

DETAILED DESCRIPTION OF THE
EXEMPLARY EMBODIMENTS

Figure 1:
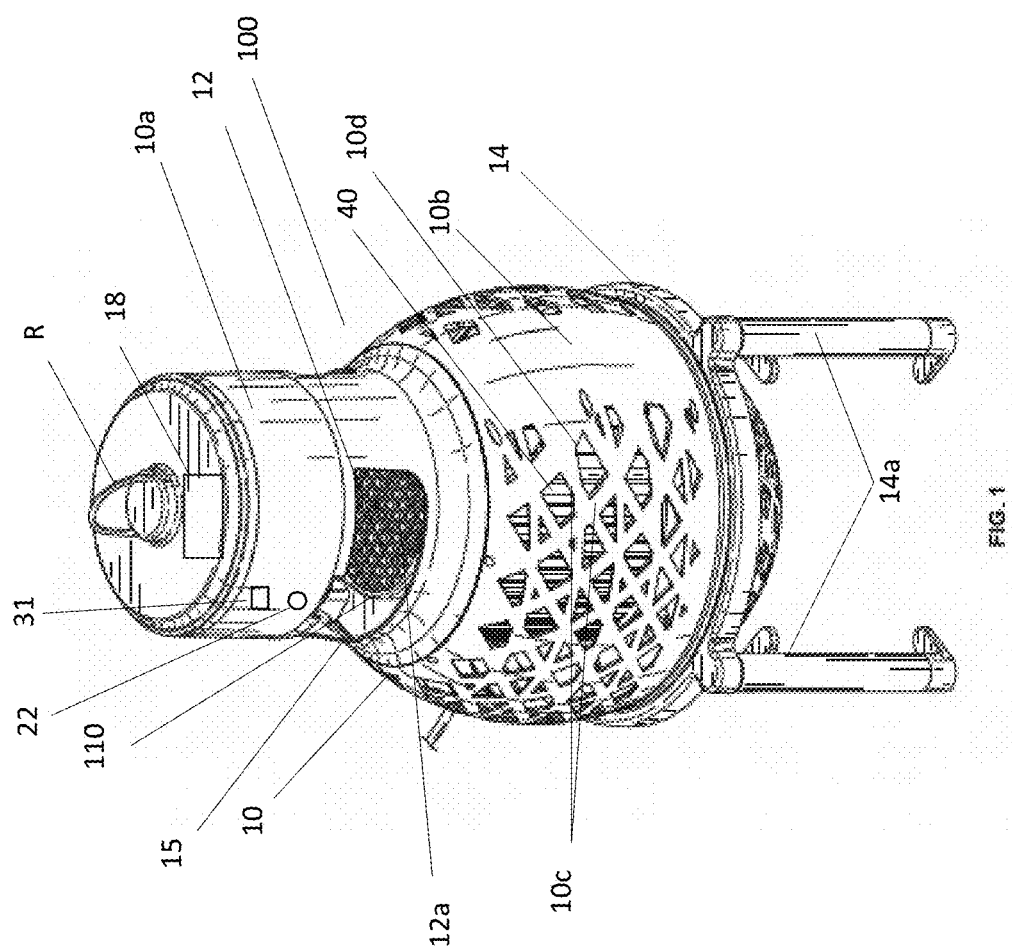
FIG. 1 illustrates a front perspective view of an insect eliminating device in accordance with an embodiment of the present disclosure.

An insect eliminating device 100 in accordance with an embodiment of the present disclosure is illustrated in FIG. 1. In embodiments, the insect eliminating device 100 may include a body 10 including a top portion 10a and a lower portion 10b. In embodiments, the body 10 may be mounted in a stand 14 including a plurality of legs 14a. In embodiments, the stand 14 may not be used. In embodiments, the lower portion 10b of the body 10 may include a plurality of ribs 10c which may be arranged in a decorative pattern such that openings 10d are provided between them. In embodiments, a ring R or other mounting element may be provided on a top surface of the top portion 10a suitable for hanging or otherwise supporting the device 100.

Figure 3:
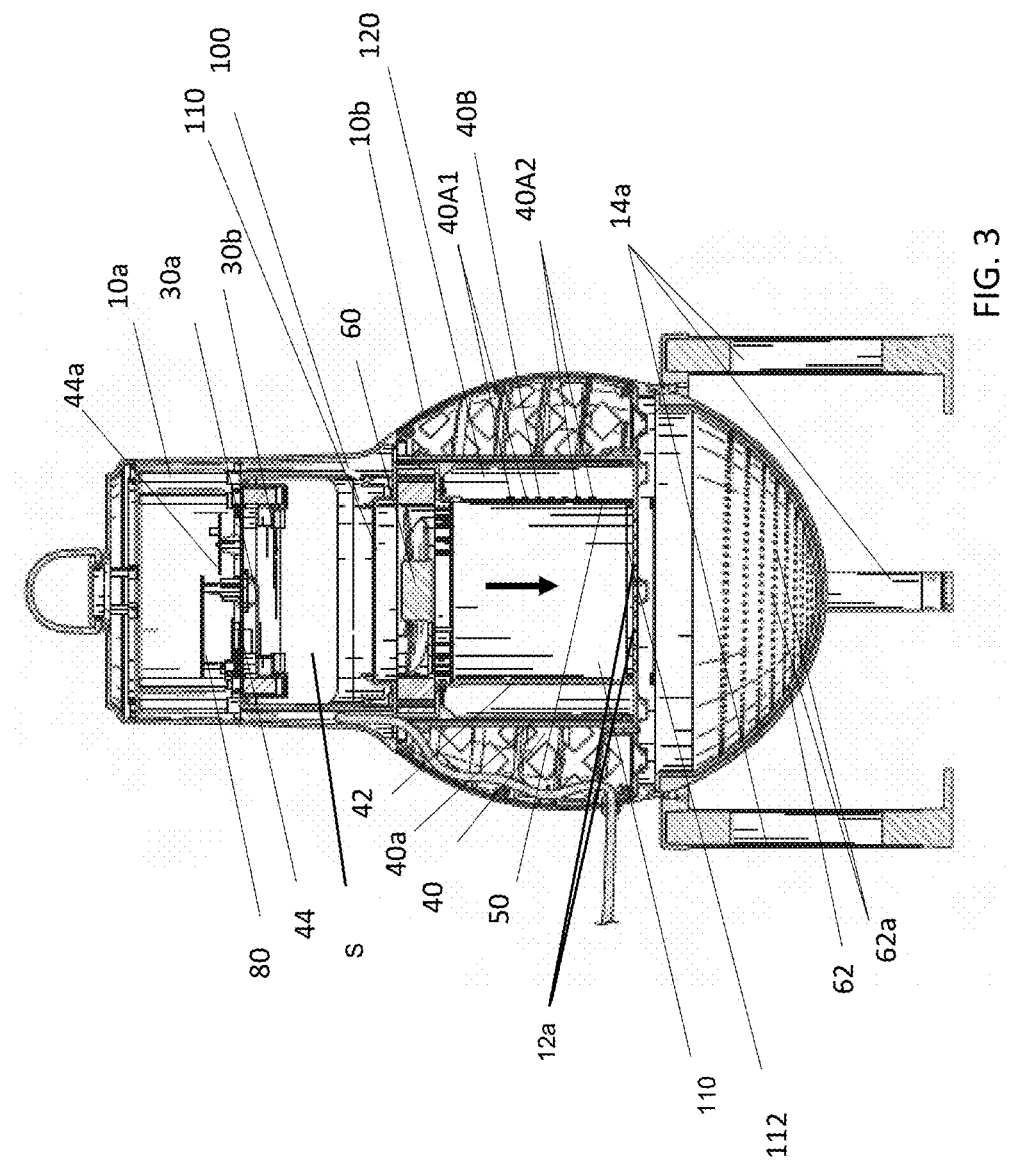
FIG. 3 illustrates a cross-sectional view of the insect eliminating device of FIGS. 1-2 in accordance with an embodiment of the present disclosure.
Figure 4:
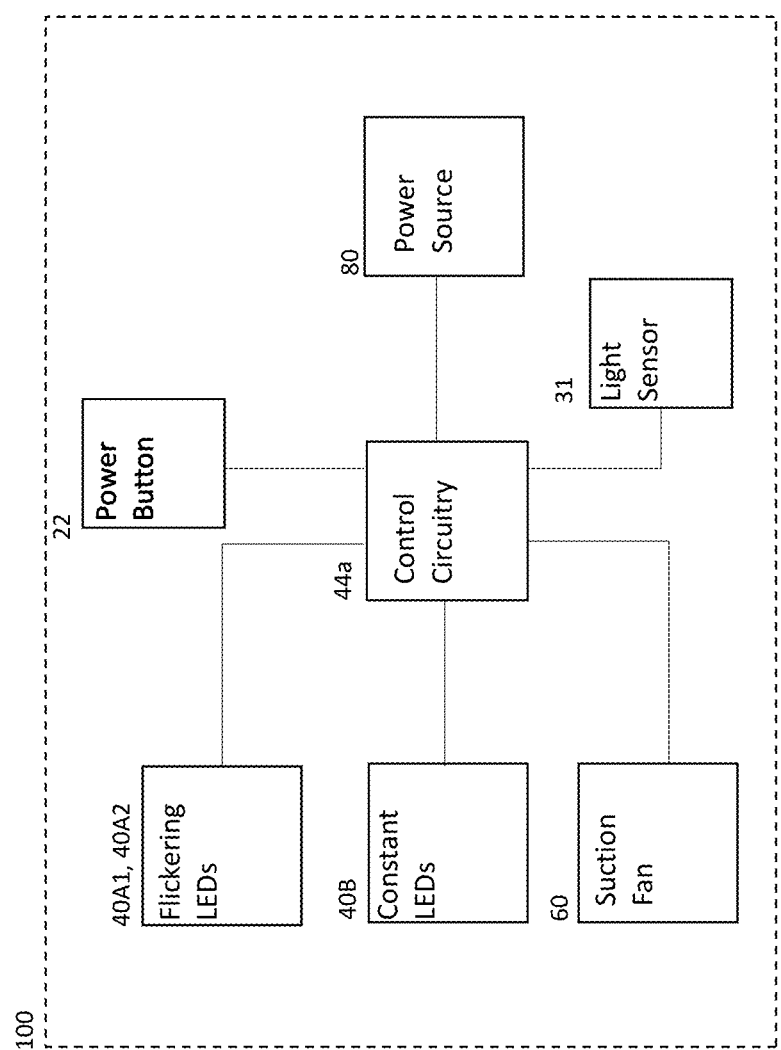
FIG. 4 illustrates an exemplary block diagram of the insect eliminating device of FIGS. 1-4.

In embodiments, a light portion 40 may be mounted in the interior of the lower portion 10b of the body 10. In embodiments, the light portion 40 may be visible through the openings 10d between the ribs 10c in the lower portion 10b of the body 10. In embodiments, the light portion 40 may include a shade 40a surrounding a plurality of light sources 40A1, 40A2 (see FIG. 3, for example). In embodiments, the shade 40a may be colored or may include multiple colors. In embodiments, the shade 40a may be substantially translucent. In embodiments, the light sources 40A1, 40A2 may be mounted on a flexible printed circuit board 42. In embodiments, the printed circuit board 42 may be wrapped around a support element 50. In embodiments, the support element 50 may be cylindrical in shape and the printed circuit board 42 may be wrapped around the support. In embodiments, the support element may not be included. In embodiments, the light elements 40A1, 40A2 may be mounted directly on the support element 50. In embodiments, the light sources 40A1, 40A2 are light emitting diodes (LEDs). In embodiments, the light sources 40A1, 40A2 may be white light LEDs that emit light through the shade 40a which may be tinted or colored to provide the impression of a flame. In embodiments, one or more of the LEDs 40A1, 40A2 may be a different color in order to provide the impression of a flame. In embodiments, the LEDs 40A1 belong to a first group and the LEDs 40A2 belong to a second group. In embodiments, the first group of the LEDs 40A1 may be driven to blink on and off together. In embodiments, the second group of LEDs 40A2 may be driven to brighten and dim in intensity together. In embodiments, the second group of LED's 40A2 may be driven to blink on and off together and the first group of LED's 40A1 may be driven to brighten and dim in intensity together. In embodiments, the second group of LEDs 40A2 may be positioned below the first group of LEDs 40A1 or vice versa. In embodiments the first group of LED's 40A1 may be driven in a first pattern and the second group of LED's 40A2 may be driven in a second pattern. In embodiments, one or more of the light emitting diodes in the first group of LEDs 40A1 or the second group of 40A2 may be of different colors. In embodiments, the light elements 40A1, 40A2 may be any suitable light source. The combination of the two groups of LEDs, when viewed through the shade 40a, which may be tinted or colored as noted above, if desired, provides the impression of a flickering flame. In embodiments, the shade 40a may be of any desired shape provided that it fits within the body 10b.

Figure 2:
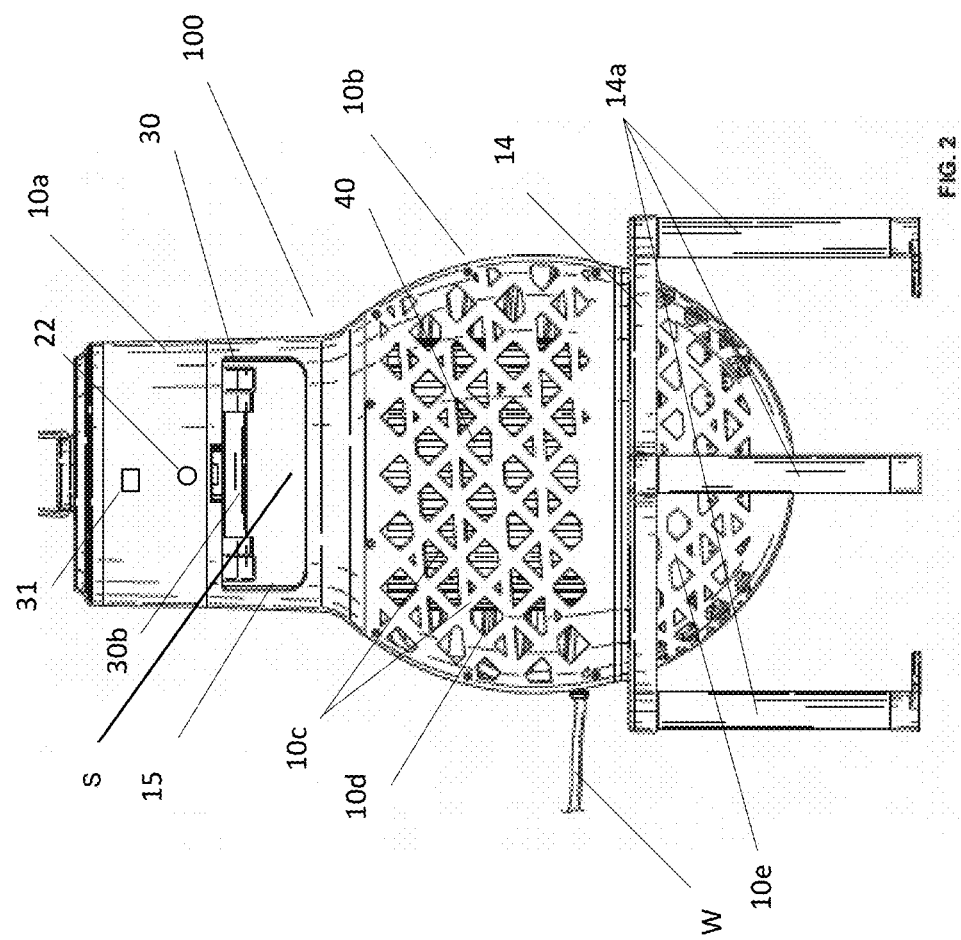
FIG. 2 illustrates a front view of the insect eliminating device of FIG. 1 in accordance with an embodiment of the present disclosure.

In embodiments, an opening 15 may be provided in a top portion 10a of the body 10. In embodiments, the opening 15 passes from one side of the top portion 10a to the other as is generally indicated in FIG. 2, for example. In embodiments, the opening 15 provides access to an interior of the top portion 10a of the body 10 from opposed sides thereof. In embodiments, a central conduit 110 provides fluid communication between a central portion 120 of the lower portion 10b of the body 10 and the open area of the top portion 10a of the body 12. In embodiments, a grate 12 including openings 12a that are sized to allow insects to pass therethrough is provided at a bottom of the central conduit 110.

In embodiments, a UV light source 30 may be mounted in the top portion 10a of the body 10. In embodiments, the UV light source 30 is visible to insects outside of the body 10 and attracts them through the opening 15 and into the top portion 10a of the body 10. In embodiments, the UV light source 30 may include a light emitting element 30a as well as a cover or lens 30b (see FIG. 3). In embodiments, the light emitting element 30a may be a light emitting diode (LED) or any other suitable light source. In embodiments, the lens 30b may be a UV lens that may be used to emit UV light to attract the insects. In embodiments, the light emitting element 30a may emit UV light without the need for the lens 30b.

In embodiments, the lower portion 10b of the body 10 may include a suction fan 60 mounted in fluid communication with the central conduit 110. In embodiments, the suction fan 60 may be selectively operable to draw air into the lower portion 10b, including any insects that have passed through the opening 15 into the interior open space S of the top portion 10a. In embodiments, the fan 60 may draw air and insects through a top grate 12 positioned at a top end of a central conduit 110. In embodiments, an interior of the support 50 may form the central conduit 110 through which the air and insects may be drawn. In embodiments, the central conduit 110 provides for a seal between the exterior of the body 12 and the interior such that the operation of the fan 60 draws insects into the conduit and down into the base 10e. In embodiments, where the support 50 is not used, the flexible PCB 42 may form the central conduit 110. In embodiments, the base 10e of the lower portion 10b of the body 10 may include a net or mesh covering 62 including openings 62a to allow air to pass but prevent insects from escaping. In embodiments, the net or mesh 62 may be provided only in the base 10e of the lower portion 10b of the body 10 and may be separated from the top portion of the lower portion 10b via grate 112 positioned at a lower end of the conduit 110 that allows insects to pass through but prevents them from moving back up. In embodiments, the net or mesh 62 is only provided in the base 10c such that it does not interfere with the aesthetic appearance of the ribs 10c or the view of the lighting element 40 from the exterior of the body 12. In embodiments, the openings 12a in the grate 112 are large enough to allow the insects to pass through but sufficiently small to prevent them from flying out.

In embodiments, the PCB 42 may include additional constant light sources 40B that may be used to provide a constant light rather than the flickering effect discussed above. In embodiments, the constant light sources 40B may be of the same color and evenly spaced around the substrate 42. In embodiments, the light sources 40B may be activated together and remain on at the same time to provide for a constant light that does not flicker. In embodiments, the light sources 40B may be white light LEDs. In embodiments, when the light sources 40B are activated, the light sources 40A1, 40A2 are not activated such that the light portion 10 may operate in a constant light mode or a flickering mode. In embodiments, the LEDs 40A1, 40A2 may be used to provide constant light by simply being operated in an on state without blinking or brightening and dimming. In embodiments, where the LEDs 40A1, 40A2 are used to provide constant light, it may not be necessary to provide the light sources 40B.

In embodiments, a circuit board 44 (see FIG. 3) may be provided to hold or provide control circuitry 44a for the lighting element 40, the UV light 30 as well as the fan 60. In embodiments, a power source 80 may be operatively connected to the PCB 44. In embodiments, the power source 80 may be provided on the circuit board 44. In embodiments, the control circuitry 44a may be provided elsewhere and need not be mounted on the circuit board 44. In embodiments, the power source 80 may be mounted elsewhere. In embodiments, the power source 80 may be a transformer or a capacitor and may be connected to an external voltage source via the wire W. In embodiments, the power source 80 may be a rechargeable battery. In embodiments, the rechargeable battery may be recharged via a line voltage via wire W or any other suitable connection, for example, via a USB, wireless or other connection. In embodiments, the power source 80 may be recharged via any other suitable power source. Any suitable power source 80 may be used. In embodiments, a solar panel may be provided and may be used to provide power directly or to recharge the rechargeable battery 80.

In embodiments, the control circuitry 44a may include an LED boost circuit (or control circuit) used to drive the UV LED 30a and/or the LEDs 40A1, 40A2 and/or LEDs 40B as well. In embodiments, other driving circuitry may be provided to drive the UV LED 30a and/or the LEDs 40A1, 40A2 and 40B. As noted above, the two groups of LEDs 40A1, 40A2 are preferably driven in a particular sequence to simulate a flame while the LEDs 40B may be driven to provide constant light. In embodiments, the control circuitry 44a may be used to control lighting of the UV light source 30 and the light sources 40A1, 40A2 and 40B even if they are not LEDs.

In embodiments, a power button or other input element 22 may be operable to activate the flickering effect of the LEDs 40A1, 40A2 and/or the LEDs 40B, or other light sources. In embodiments, the power button 22 may activate the fan 60 and/or the UV light source 30, however, typically, the fan 60 and UV light source 30 will be activated together. In embodiments, the fan 60, UV light source 30 and the flickering LEDs 40A1, 40A2 will all be activated together by the power button 22. In embodiments, the fan 60, UV light source 30 and the LEDs 40B may be activated together by the power button 22. In embodiments, as noted above, the additional LEDs 40B or other light sources may be used to provide for a constant light rather than flickering and may also be controlled by input from the power button 22. In embodiments, the power button 22 may be positioned elsewhere. In embodiments, these constant light sources 40B may be activated with or without activation of the fan 60 and/or the UV light source 30. In embodiments, other input elements, other than the power button 22, may be used to provide input to control the fan 60, the UV light source 30, the flickering LEDs 40A1, 40A2 and/or the constant light sources 40B. In embodiments, a light sensor 31 may provide information regarding ambient light levels around the device 100. In embodiments, the lighting element 40 may be activated when the ambient light level drops below a threshold level and may turn off when the light level rises above the threshold. In embodiments, the light sensor 31 may be a photocell, however, any suitable light sensor device may be used. In embodiments, the light sensor 31 may be provided on the top of the top portion 10a. In embodiments, the light sensor may 31 be integrated into a solar panel 18. In embodiments, a separate light sensor 31 may be provided elsewhere on the lighting element 100. In embodiments, the light sensor 31 may not be included.

FIG. 5 illustrates an exemplary block diagram of device 100. In embodiments, the power source 80 provides power to the fan 60, the UV light source 30 and the flickering LEDs 40A1, 40A2 and LEDs 40B. The control circuitry 44a on PCB 44 which may be or include the boost circuit, and/or other circuitry, may drive the UV light source 30, the flickering LEDs 40A1, 40A2 and LEDs 40B. The control circuitry 44a may include other control circuitry to control activation of the fan 60. As noted above, the flickering LEDs 40A1, 40A2 may be driven in respective patterns to simulate the appearance of a flickering flame and the LEDs 40B may be activated to provide constant light when desired. In embodiments, where a solar panel 18 is provided, the solar panel 18 may provide power to recharge the power source 80. In embodiments, the solar panel 18 may not be included. In embodiments, the light portion 40 may include other charging circuitry or inputs to allow for USB or wireless charging, if desired. In embodiments, the control circuitry 44a may be connected to the power button 22 (or other input element) and may drive the fan 60, the UV light source 30, the flickering LEDs 40A1, 40A2 and constant light LEDs 40B based on input provided. In embodiments, separate control circuitry may be provided and connected to the power button 22 and the control circuitry 44a to control the fan 60, the UV light source 30, the flickering LEDs 40A1, 40A2 and LEDs 40B. In embodiments, the light level information provided by the light sensor 31, when present, may be provided to the control circuitry 44a. In embodiments, the control circuitry 44a may include a processor, microprocessor or other control element or component to provide for control of the fan 60, the UV light source 30 and the flickering LEDs 40A1, 40A2. In embodiments, control of the fan 60, the UV light source 30, the flickering LEDs 40A1, 40A2 and LEDs 40B may be based on both input from the power button 22 and the light sensor. In embodiments, the power button 22 may be pressed once, or placed in a first position, to enter a light monitoring mode in which power is provided to one or more of the fan 60, the UV light source 30, the flickering LEDs 40A1, 40A2 or constant light LEDs 40B when the light information indicates a light level below a threshold. In embodiments, one or more of the fan 60, the UV light source 30, the flickering LEDs 40A1, 40A2 and the constant light LEDs 40B may be deactivated when the light level rises above the threshold. In embodiments, pushing the button 22 again, or putting it in a second position, may directly activate one or more of the fan 60, the UV light source 30, the flickering LEDs 40A1, 40A2 and the constant light LEDs 40B without consideration of the light level information. In embodiments, as noted above, each of the fan 60, the UV light source 30, the flickering LEDs 40A1, 40A2 and constant light LEDs 40B may be activated independently, if desired, based on operation of, or the position of, the power button and/or light level information provided by the light sensor. In embodiments, the fan 60 and UV light source 30 may be activated independent of the light level information. In embodiments, as noted above, other input elements may provide information to control the fan 60, the UV light source 30, the flickering LEDs 40A1, 40A2 and the constant light LEDs 40B. In embodiments, the device 100 may be placed in an off mode in which all of the fan 60, the UV light source 30, the flickering LEDs 40A1, 40A2 and/or LEDs 40B are deactivated and stay that way regardless of light sensor information until activation of the power button 22 or another input element.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. An insect eliminating device comprising:
    a body including a top portion and a bottom portion provided below the top portion;
    a light portion mounted in the body and including:
        a UV light element mounted in an open space provided in the top portion;
        a flickering light portion mounted in the bottom portion;
    a central conduit providing fluid communication between an open space in the top portion and the bottom portion of the body;
    a fan, mounted in the bottom portion to direct air from the open space in the top portion, through the central conduit and into the lower portion; and
    a grid mounted at a bottom end of the central conduit including a plurality of openings sized to allow air and insects to pass downward into the bottom portion of the base and prevent insects from passing upwards into the central conduit.

2. The insect eliminating device of claim 1, wherein the UV light element is a UV light emitting diode.

3. The insect eliminating device of claim 1, wherein the flickering light portion includes a first group of light emitting elements configured to emit light in a first pattern and a second group of light emitting elements configured to emit light in a second pattern.

4. The insect eliminating device of claim 3, further comprising a support provided in the bottom portion of the body, wherein the first group of light emitting elements and the second group of light emitting elements are mounted on the support.

5. The insect eliminating device of claim 1, further comprising a shade mounted in the bottom portion of the body, wherein the shade surrounds the flickering light portion.

6. The insect eliminating device of claim 1, wherein the light portion includes at least one constant light element.

7. The insect eliminating device of claim 1, further comprising a cage element provided around the bottom portion of the body configured to prevent insects from exiting the bottom portion of the body.

8. The insect eliminating device of claim 1, further comprising a control circuit operably connected to the light portion and the fan to selectively activate the UV light portion, the flickering light portion and the fan to draw insects from the open space in the top portion into the central conduit and to the bottom portion of the body.

9. The insect eliminating device of claim 8, further comprising an input device operably connected to the control circuit, wherein the control circuit selectively operates the light portion and the fan based on input provided by the input device.

10. The insect eliminating device of claim 1, further comprising a light sensor operably connected to the control circuit, wherein the control circuit selectively activates the light portion and the fan based on an ambient light level detected by the light sensor.

11. The insect eliminating device of claim 10, further comprising an input device operably connected to the control circuit, wherein the control circuit selectively activates the light portion and the fan based on input provided by the input device.

12. The insect eliminating device of claim 10, further comprising a power source mounted in the body and configured to provide power to the control circuit, light portion and the fan.

13. The insect eliminating device of claim 12, wherein the power source is a battery.

14. The insect eliminating device of claim 12, wherein the power source is a rechargeable battery.

15. The insect eliminating device of claim 12, further comprising a solar panel mounted on a top of the body and operably connected to the power source to recharge the power source.

16. The insect eliminating device of claim 12, wherein the control circuit includes a charging circuit configured to control charging of the power source.

17. The insect eliminating device of claim 12, further comprising a wire connectable to an exterior power source, wherein the wire is electrically connected to the power source and operable to recharge the power source.

18. The insect eliminating device of claim 1, furth comprising a stand configured to receive the body.

19. The insect eliminating device of claim 1, wherein the light portion further comprises a constant light source.

20. The insect eliminating device of claim 19, wherein the constant light source includes a plurality of constant light elements.

* * * * *